US006171729B1

(12) United States Patent
Gan et al.

(10) Patent No.: US 6,171,729 B1
(45) Date of Patent: Jan. 9, 2001

(54) CONTROL OF SWELLING IN ALKALI METAL ELECTROCHEMICAL CELLS

(75) Inventors: Hong Gan; Esther S. Takuchi, both of East Amherst, NY (US)

(73) Assignee: Wilson Greatbatch Ltd, Clarence, NY (US)

( * ) Notice: Under 35 U.S.C. 154(b), the term of this patent shall be extended for 0 days.

(21) Appl. No.: 09/002,534

(22) Filed: Jan. 2, 1998

(51) Int. Cl.[7] .................................................. H01M 10/44
(52) U.S. Cl. ................. 429/231.95; 429/231.5; 429/219
(58) Field of Search ........................... 429/231.95, 231.5, 429/219

(56) References Cited

U.S. PATENT DOCUMENTS 5,434,017 * 7/1995 Berkowitz et al. ..................... 429/94
5,458,997 * 10/1995 Crepsi et al. ......................... 429/219

* cited by examiner

*Primary Examiner*—Maria Nuzzolillo
*Assistant Examiner*—Monique Wills
(74) *Attorney, Agent, or Firm*—Hodgson Russ Andrews Woods & Goodyear LLP

(57) ABSTRACT

An alkali metal/solid cathode electrochemical cell, particularly a Li/SVO cell, having an anode-to-cathode (A/C) capacity ratio of about 0.68 to about 0.96, is described. This provides the cell with negligible, if any, cell swelling during discharge.

13 Claims, 6 Drawing Sheets

CONTROL OF SWELLING IN ALKALI METAL ELECTROCHEMICAL CELLS

BACKGROUND OF THE INVENTION

1. Field of the Invention

The present invention generally relates to the conversion of chemical energy to electrical energy, and more particularly, to an alkali metal electrochemical cell having an anode-to-cathode (A/C) capacity ratio specifically balanced to improve cell swelling without appreciably detracting from cathode efficiency. A preferred couple is an alkali metal/solid cathode active material and a most preferred chemistry is a lithium/transition metal oxide couple.

2. Prior Art

Lithium batteries have been successfully used to power implantable medical devices such as pacemakers, cardiac defibrillators, and the like. However, it is known that lithium batteries swell when they reach certain voltages during discharge. In the design of medical devices, this swelling must be accounted for so that enough void space is left for the battery volume change in order to prevent damage to the device circuitry. Consequently, the more swelling the battery experiences, the more void space that must be reserved, which directly impacts the device total volume. In the field of implantable medical devices, a smaller total device volume is desired. Thus, it is desirable to minimize or even eliminate the existence of swelling in lithium batteries, especially those used to power implantable medical devices, to provide a more efficient design and improve the safety characteristics of the implantable device.

A chemistry that provides high discharge capacity and high energy current pulses required for powering cardiac defibrillators and other implantable medical devices is the lithium/silver vanadium oxide ($Ag_2V_4O_{11}$, SVO) couple. U.S. Pat. No. 5,458,997 to Crespi et al. describes an electrochemical cell having a lithium anode and a silver vanadium oxide cathode, wherein the cell is anode limited. This patent states that in the discharge of a conventionally balanced Li/SVO cell, the resistance increases as a function of time beginning at the second voltage plateau 310 on its discharge curve (FIG. 5 of Crespi et al.). In that respect, Crespi et al. rebalances the cell active components to include less of the lithium and electrolyte materials than would be used in a conventionally balanced cell. The rebalanced cell has the ratio of capacity ($Q_-$) of the anode divided by the capacity ($Q_+$) of the cathode between 0.45 and 0.70. This rebalancing allows discharge to occur only through the first voltage plateau and the first ramp to the start of the second voltage plateau, thus avoiding that portion of the discharge curve (the second voltage plateau region) in which resistance buildup occurs in conventionally balanced Li/SVO cells. The disadvantage of this approach is a loss of cell capacity by about 250 mAh (FIG. 6, line 370 vs. FIG. 7, line 385 in Crespi et al.).

Therefore, there is a need for a lithium/transition metal oxide battery that is dischargeable to deliver the high capacity needed for powering implantable medical devices and the like, but which experiences little, if any, swelling during discharge. The cell of the present invention fulfills this need by utilizing both voltage plateaus typical in the discharge of a Li/SVO cell for high discharge capacity while at the same time the effects of cell swelling are minimized through a rebalanced anode-to-cathode (A/C) capacity ratio. Thus, by using both voltage plateaus and both ramps and by rebalancing the cell active components, the cell swelling problem is controlled without detracting from the electrochemical reactions at the electrodes. Rebalancing the active components according to the present invention is also useful for decreasing swelling in a lithium/copper silver vanadium oxide cell as well.

SUMMARY OF THE INVENTION

The object of the present invention is, therefore, to improve the cell swelling performance of an alkali metal/transition metal oxide electrochemical cell such as a lithium/silver vanadium oxide cell or a lithium/copper silver vanadium oxide cell without appreciably detracting from the cell's discharge capacity. This goal is accomplished by rebalancing the anode-to-cathode capacity ratio of the cell (based on the gram amount of active material in the anode and in the cathode) such that the cell is still capable of delivering high discharge capacity and high current pulses while at the same time minimizing case swelling typically associated with such power sources.

In the present invention, the preferred anode is lithium metal and the preferred cathode is a transition metal oxide for example, silver vanadium oxide, $Ag_2V_4O_{11}$ (SVO) or copper silver vanadium oxide (CSVO). The preferred electrolytes include 1.0M to 1.4M $LiAsF_6$ or $LiPF_6$ as an ion-forming alkali metal salt dissolved in solvents containing at least one high permittivity solvent such as propylene carbonate and at least one low viscosity solvent such as 1,2-dimethoxyethane. This chemistry provides a cell that delivers high discharge capacity interruptable from time to time to deliver current pulse discharges.

These and other objects of the present invention will become increasingly more apparent to those skilled in the art by reference to the following description and to the appended drawings.

DETAILED DESCRIPTION OF THE PREFERRED EMBODIMENTS

Figure 1:
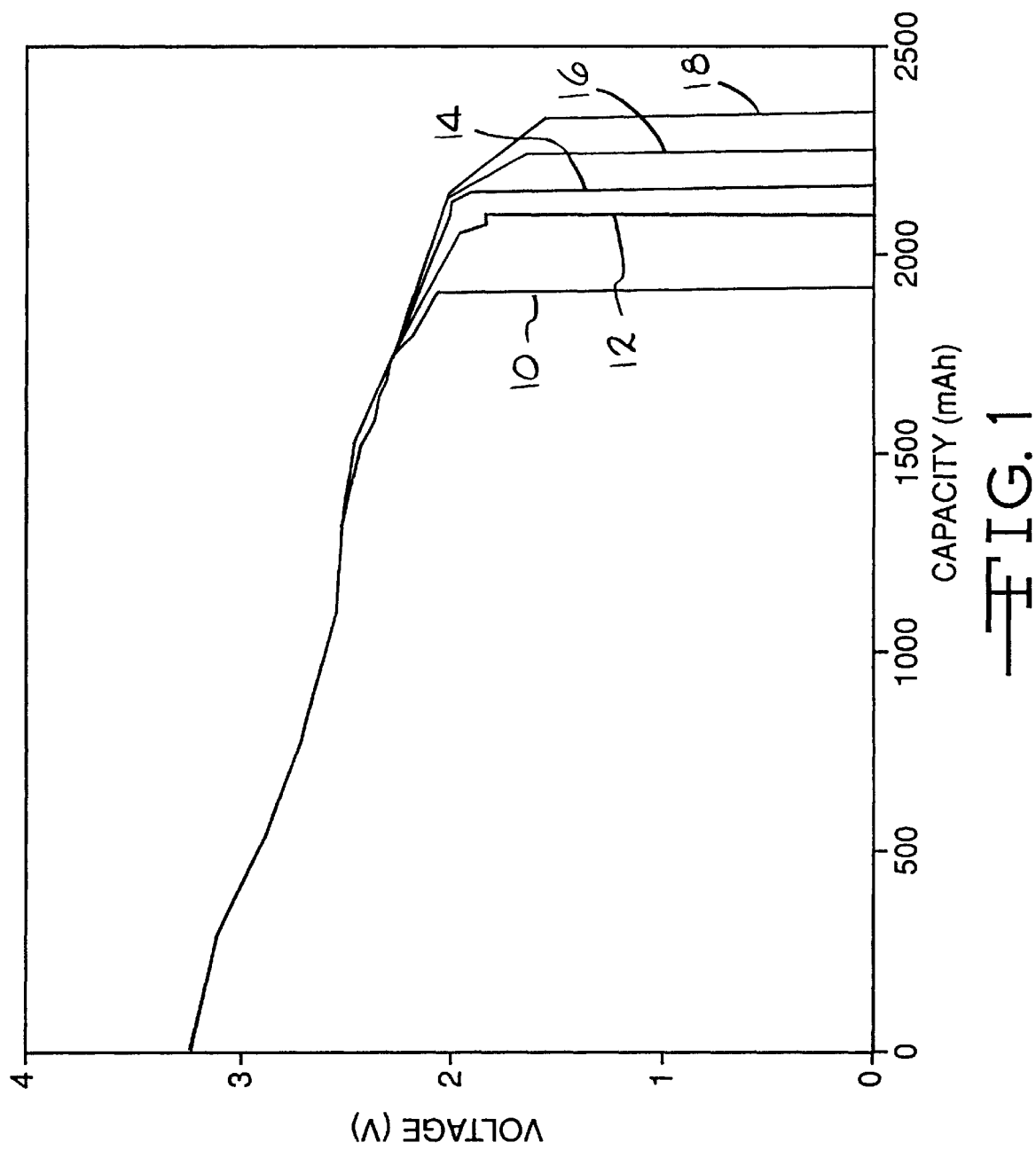
FIG. 1 is a graph constructed from the voltage versus discharge capacity of Li/SVO cells having various anode-to-cathode capacity ratios.

The electrochemical cell of the present invention comprises an anode of a metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising titanium, titanium alloy or nickel, to form an anode component. Copper, tungsten and tantalum are also suitable materials for the anode current collector. In the exemplary cell of the present invention, the anode component has an extended tab or lead of the same material as the anode current collector, i.e., preferably nickel or titanium, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell of the present invention further comprises a cathode of electrically conductive material which serves as the other electrode of the cell.

The cathode is preferably of a solid material and the electrochemical reaction at the cathode involves conversion of ions which migrate from the anode to the cathode in atomic or molecular forms. The solid cathode material may comprise a metal element, a metal oxide, a mixed metal oxide and a metal sulfide, and combinations thereof. The metal oxide, the mixed metal oxide and the metal sulfide can be formed by the chemical addition, reaction, or otherwise intimate contact of various metal oxides, metal sulfides and/or metal elements, preferably during thermal treatment, sol-gel formation, chemical vapor debposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds.

One preferred mixed metal oxide is a transition metal oxide having the general formula $SM_xV_2O_y$ wherein SM is a metal selected from Groups ID to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_y$ in any one of its many phases, i.e., β-phase silver vanadium oxide having in the general formula x=0.35 and y=5.8, γ-phase silver vanadium oxide having in the general formula x=0.74 and y=5.37 and ε-phase silver vanadium oxide having in the general formula x=1.0 and y=5.5, and combination and mixtures of phases thereof. For a more detailed description of such a cathode active material reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ with silver in either the silver (II), silver (I) or silver (0) oxidation state and CuO with copper in either the copper (II), copper (I) or copper (0) oxidation state to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material composition found for $Cu_xAg_yV_2O_z$ is preferably about $0.01 \leq z \leq 6.5$. Typical forms of CSVO are $Cu_{0.16}Ag_{0.67}V_2O_z$, with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and U.S. Pat. No. 5,516,340 to Takeuchi et al., both of which are assigned to the assignee of the present invention and incorporated herein by reference.

Additional cathode active materials useful with the present invention include manganese dioxide, lithium cobalt oxide, lithium nickel oxide, copper oxide, titanium disulfide, copper sulfide, iron sulfide, iron disulfide, copper vanadium oxide, fluorinated carbon, and mixtures thereof. Preferably, the cathode comprises from about 80 to about 99 weight percent of the cathode active material.

Before fabrication into an electrode for incorporation into an electrochemical cell according to the present invention, the cathode active materials prepared as described above are preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

Cathode components for incorporation into the cell may be prepared by rolling, spreading or pressing the cathode active mixture of the present invention onto a suitable current collector selected from the group consisting of stainless steel, titanium, tantalum, platinum and gold. The preferred current collector material is titanium, and most preferably the titanium cathode current collector has a thin layer of graphite/carbon paint applied thereto. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, nonwoven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversion of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. Preferably, the ion-forming alkali metal salt is similar to the alkali metal comprising the anode.

In the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL) and N-methyl-pyrrolidinone (NMP) and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

During discharge, SVO is converted to its lithium intercalated form, $Li_xAg_2V_4O_{11}$, where x ranges from 0 to about 7. It has been determined that when SVO batteries are discharged to the stage at which the cell open circuit voltage drops below about 2.4 volts (x>5), battery swelling begins to occur. Depending on the discharge conditions, the total cell thickness change can be as high as 25% or more of the original cell thickness.

According to the present invention, the percentage of cell swelling during discharge of the lithium/transition metal oxide couple is reduced over that known in the prior art by redesigning or re-balancing the anode-to-cathode (A/C) capacity ratio. The amount of active material within the cathode determines the theoretical capacity of the cathode. For implantable device power supplies an indication of battery state of discharge is always desirable (sloped voltage profile, impedance change, etc.) so that physicians and patients can decide when the battery needs to be replaced. For SVO batteries, which are typically used in today's implantable medical devices such as cardiac defibrillators, the beginning of the second voltage plateau (2.6V) indicates the utilization of about 50% of the battery service life (40% of cathode efficiency). When the cell potential reaches the end of the second plateau (~2.5V), about 80% of battery service life has been consumed (70% of cathode efficiency). For patient safety, the battery now needs to be replaced before complete consumption of the remaining 20% of useful service life. In that respect, the gradual decrease in cell voltage from 2.5V to 2.2V (the second ramp of an SVO cell) is monitored and used as the implantable device's end of service life indicator.

It is known that electrolyte solvent decomposition contributes to alkali metal/transition metal oxide cell swelling. For example, in a lithium/silver vanadium oxide (Li/SVO) cell activated with 1.0M $LiAsF_6$ in a 50:50 mixture, by volume, of PC:DME, propene has been found to be the major component of the gaseous products. It is believed that propylene carbonate in the electrolyte is catalytically decomposed to form propene and lithium carbonate according to the following reaction:

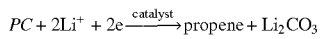

Thus, the catalytic decomposition of propylene carbonate to form propene primarily depends on the state of SVO cathode lithium ion intercalation. Since gas formation is found only when the cell reaches open circuit voltage potentials lower than about 2.4V (x>5), according to the present invention, formation of the catalyst is avoided by preventing the SVO cathode from reaching such a lithium intercalation state. This is accomplished by rebalancing the A/C ratio to a range of 0.96 (x=6.7) to 0.68 (x=4.8) based on 7.00 equivalents of lithium required to completely discharge one equivalent of ε-phase SVO ($Ag_2V_4O_{11}$). In that manner, propene formation is reduced during the discharge of an alkali metal/transition metal oxide electrochemical cell. Unexpectedly, this results in a decrease in swelling at end-of-life (EOL) of cell discharge by about 80 of the swelling typically experienced in conventional alkali metal electrochemical cells activated with a 50:50 percent mixture, by volume, of PC:DME.

In the previously referenced Crespi et al. patent, the ratio of capacity ($Q_-$) of the anode divided by the capacity ($Q_+$) of the cathode was calculated based on about 6.67 equivalents of lithium required to completely discharge one equivalent of SVO. Using the present SVO theoretical capacity value (p7 equivalents of Li intercalation), the A/C ratio range of Crespi et al. is recalculated to 0.43 to 0.67 (instead of 0.45 to 0.70). Thus, the present A/C ratio range of 0.96 to 0.68 does not overlap with that of the prior art.

The preferred form of the electrochemical cell is a case-negative design wherein the anode/cathode couple is inserted into a conductive metal casing such that the casing is connected to the anode current collector, as is well known to those skilled in the art. A preferred material for the casing is titanium although stainless steel, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Fifteen lithium/silver vanadium oxide cells were constructed from lithium anode material pressed on nickel current collector screen and silver vanadium oxide cathode material pressed on titanium current collector screen. The cells were divided into five groups of three cells each delineated by their A/C capacity ratio (based on the gram amount of electrode active material in the cells). The electrodes were each assembled into a prismatic cell stack configuration with two layers of microporous membrane propylene separator sandwiched between the anode and the cathode. The electrode assemblies were then hermetically sealed in a stainless steel casing in a case negative configuration and activated with an electrolyte consisting essentially of 1.0M $LiAsF_6$ in a 50:50 mixture, by volume, of PC:DME.

A constant resistance load of 3.57 kΩ was applied to all of the cells for 21 hours during an initial predischarge period. The predischarge period is referred to as burn-in and depleted the cells of approximately 1% of their theoretical capacity. Following burn-in, the cells were subjected to acceptance pulse testing consisting of four 10 second pulses (23.2 $mA/cm^2$) with a 15 second rest between each pulse.

Following acceptance pulse testing, all of the cells were discharged by applying a pulse train every week under a 2 Kohm load for 6 weeks (7 pulse trains). The pulse trains consisted of four 10 second pulses (23.2 $mA/cm^2$) with a 15 second rest between each pulse. Following the seven pulse trains, the cells were discharged under a 5 Kohm constant resistor load until the cells reached 0.0V. Cell thickness was monitored periodically. The data of final percentage change of cell thickness relative to A/C ratios and the theoretical maximum lithium intercalation (theoretical x) are summarized in Table 1.

TABLE 1

| Group | Cell | A/C | Theoretical x ($Li_xAg_2V_4O_{11}$) | % Total Cell Thickness Change |
|---|---|---|---|---|
| 1 | a | 1.141 | 7.99 | 25.6 |
|   | b | 1.123 | 7.86 | 21.5 |
|   | c | 1.135 | 7.95 | 20.1 |
| 2 | a | 1.078 | 7.55 | 17.4 |
|   | b | 1.075 | 7.53 | 16.8 |
|   | c | 1.077 | 7.54 | 15.8 |
| 3 | a | 1.044 | 7.31 | 16.5 |
|   | b | 1.041 | 7.29 | 16.1 |
|   | c | 1.034 | 7.24 | 15.1 |
| 4 | a | 0.995 | 6.97 | 13.4 |
|   | b | 0.983 | 6.88 | 13.0 |
|   | c | 0.981 | 6.87 | 10.6 |
| 5 | a | 0.923 | 6.46 | 3.3 |
|   | b | 0.922 | 6.45 | 1.7 |
|   | c | 0.917 | 6.42 | 0.4 |

Data collected from representative ones of the cells of each of Groups 1 to 5 in Table 1 were graphed to illustrate the improvements in cell swelling in the Li/SVO couple without compromising cathode efficiency. FIG. 1 shows the effect of anode-to-cathode (A/C) capacity ratio versus discharge capacity in the representative Li/SVO cells. In particular, curve 10 was constructed from a representation Li/SVO cell having an A/C ratio 0.923, curve 12 was constructed from a cell having an A/C ratio of 0.995, curve 14 was constructed from a cell having an A/C ratio of 1.044, curve 16 was constructed from a cell having an A/C ratio of 1.078 and curve 18 was constructed from a cell having an A/C ratio of 1.135. All of the cells with an A/C ratio from 1.135 to 0.923 followed the same voltage profile. However, when the A/C ratio is smaller, the cell reached 0.0V sooner.

Figure 2:
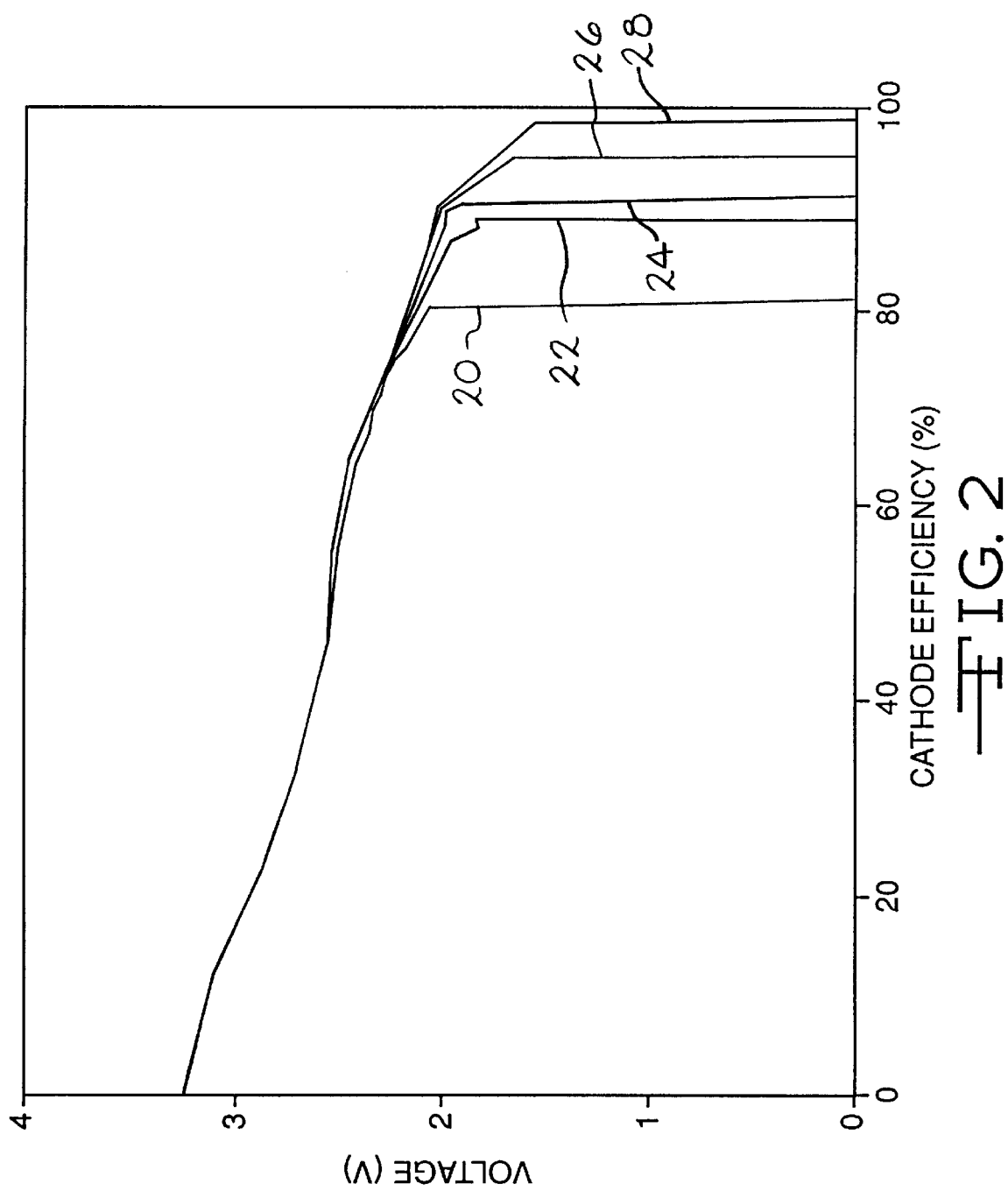
FIG. 2 is a graph constructed from the voltage versus cathode discharge efficiency of the Li/SVO cells used to construct the graph of FIG. 1.

In FIG. 2 the x coordinate in FIG. 1 is changed from cell capacity to cathode efficiency. In particular, curve 20 was constructed from a representation Li/SVO cell having an A/C ratio of 0.923, curve 22 was constructed from a cell having an A/C ratio of 0.995, curve 24 was constructed from a cell having an A/C ratio of 1.044, curve 26 was constructed from a cell having an A/C ratio of 1.078 and curve 28 was constructed from a cell having an A/C ratio of 1.135. The data suggest that with an A/C ratio of 1.135, only about 99% cathode efficiency can be delivered. This means that for efficient utilization of a SVO cathode, more anode capacity is needed in the cell active component balance. The same conclusion can be drawn for all other A/C ratio cells.

Figure 3:
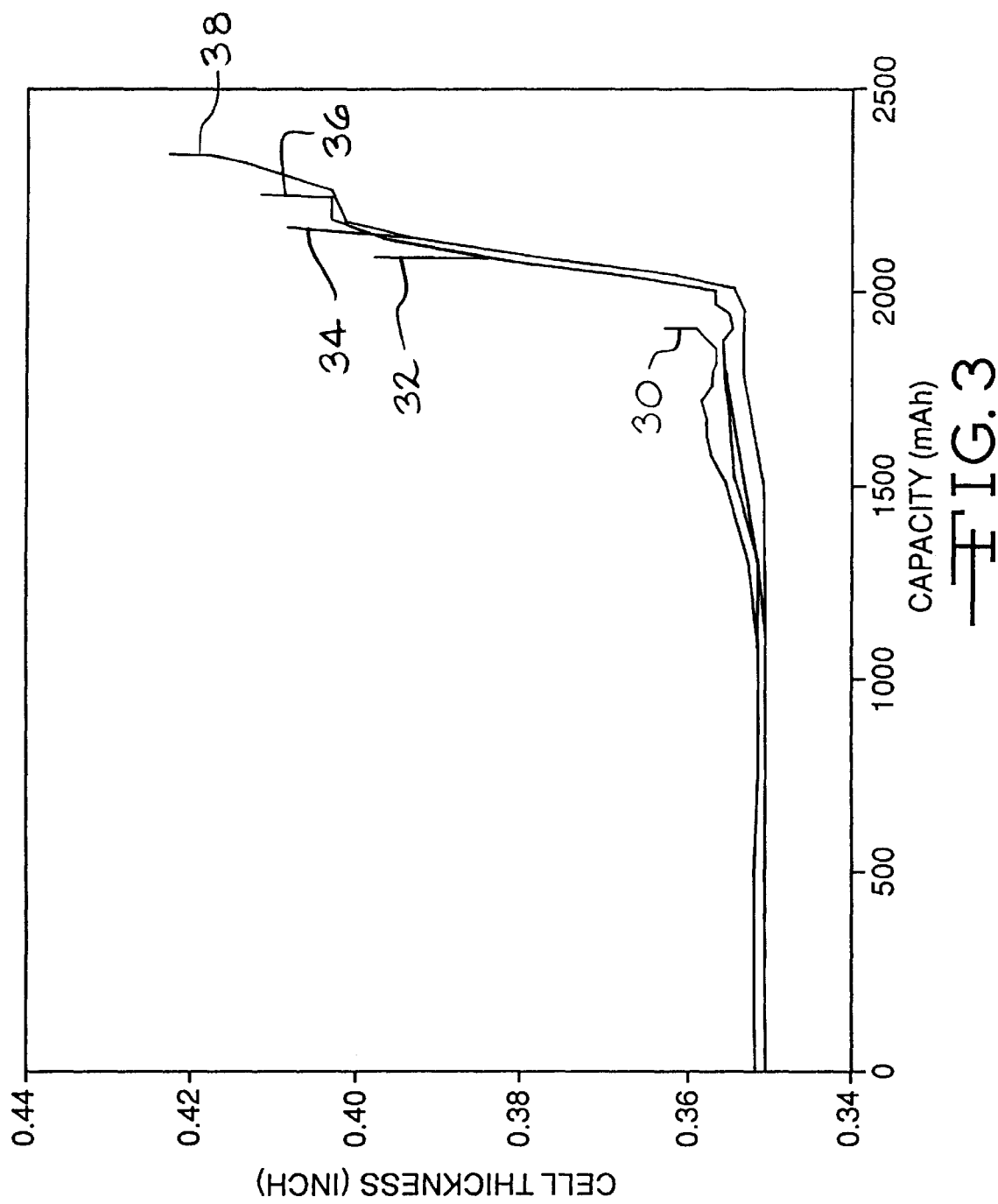
FIG. 3 is a graph constructed from cell swelling versus discharge capacity of the Li/SVO cells used to construct the graph of FIG. 1.

FIG. 3 shows the correlation of A/C ratio with cell swelling. In particular, curve 30 was constructed from a representation Li/SVO cell having an A/C ratio of 0.923, curve 32 was constructed from a cell having an A/C ratio of 0.995, curve 34 was constructed from a cell having an A/C ratio of 1.044, curve 36 was constructed from a cell having an A/C ratio of 1.078 and curve 38 was constructed from a cell having an A/C ratio of 1.135. No matter what the A/C ratio, the cell thickness change followed the same curve. When the cells reach 0.0V, the cell stops swelling. Therefore, the lower the A/C ratio, the less the cell swelling. From FIGS. 1 and 3, the correlation between cell swelling and cell discharge capacity and A/C ratio is clearly demonstrated.

Figure 4:
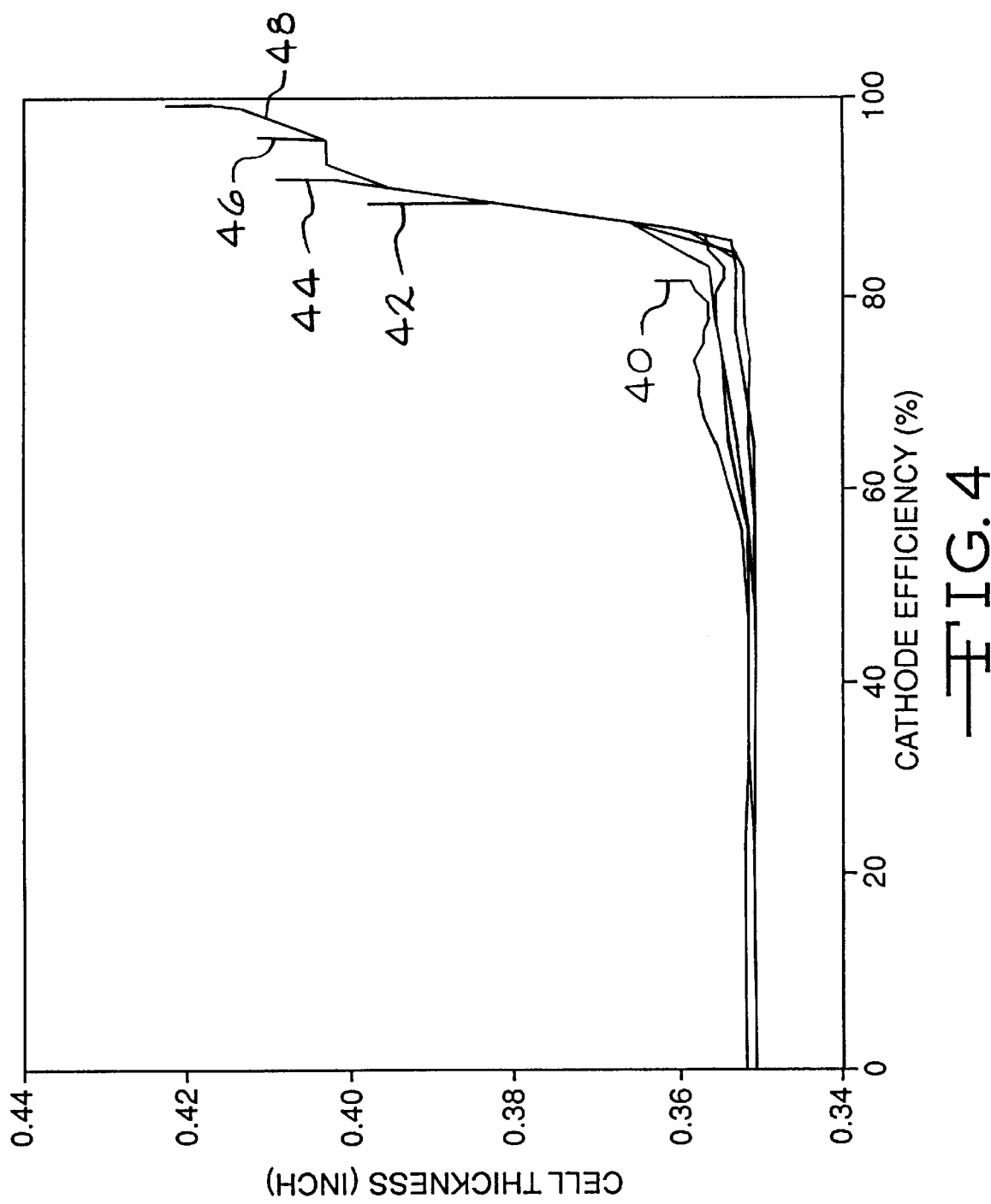
FIG. 4 is a graph constructed from cell swelling versus cathode discharge efficiency of the Li/SVO cells used to construct the graph of FIG. 1.

FIG. 4 presents the relationship between cathode efficiency and cell swelling. In particular, curve 40 was constructed from a representation Li/SVO cell having an A/C ratio of 0.923, curve 42 was constructed from a cell having an A/G ratio of 0.995, curve 44 was constructed from a cell having ah A/C ratio of 1.044, curve 46 was constructed from a cell having an A/C ratio of 1.078 and curve 48 was constructed from a cell having an A/C ratio of 1.135.

Li/SVO cells start to swell between about 56% to 65% cathode efficiency. The middle point is at about 61% cathode efficiency. This cathode efficiency represent the end of the second voltage plateau or the beginning of the second ramp (see FIG. 2), and is the lower limit for the rebalanced A/C ratio at which cell swelling can be completely prevented. According to the data from FIG. 2, the lower limit of the A/C ratio to achieve this cathode efficiency should be larger than 61%. The actual number is determined by the results of FIG. 5. FIG. 4 also shows that from about 61% to about 85% cathode efficiency the SVO batteries only showed minimum swelling.

Figure 5:
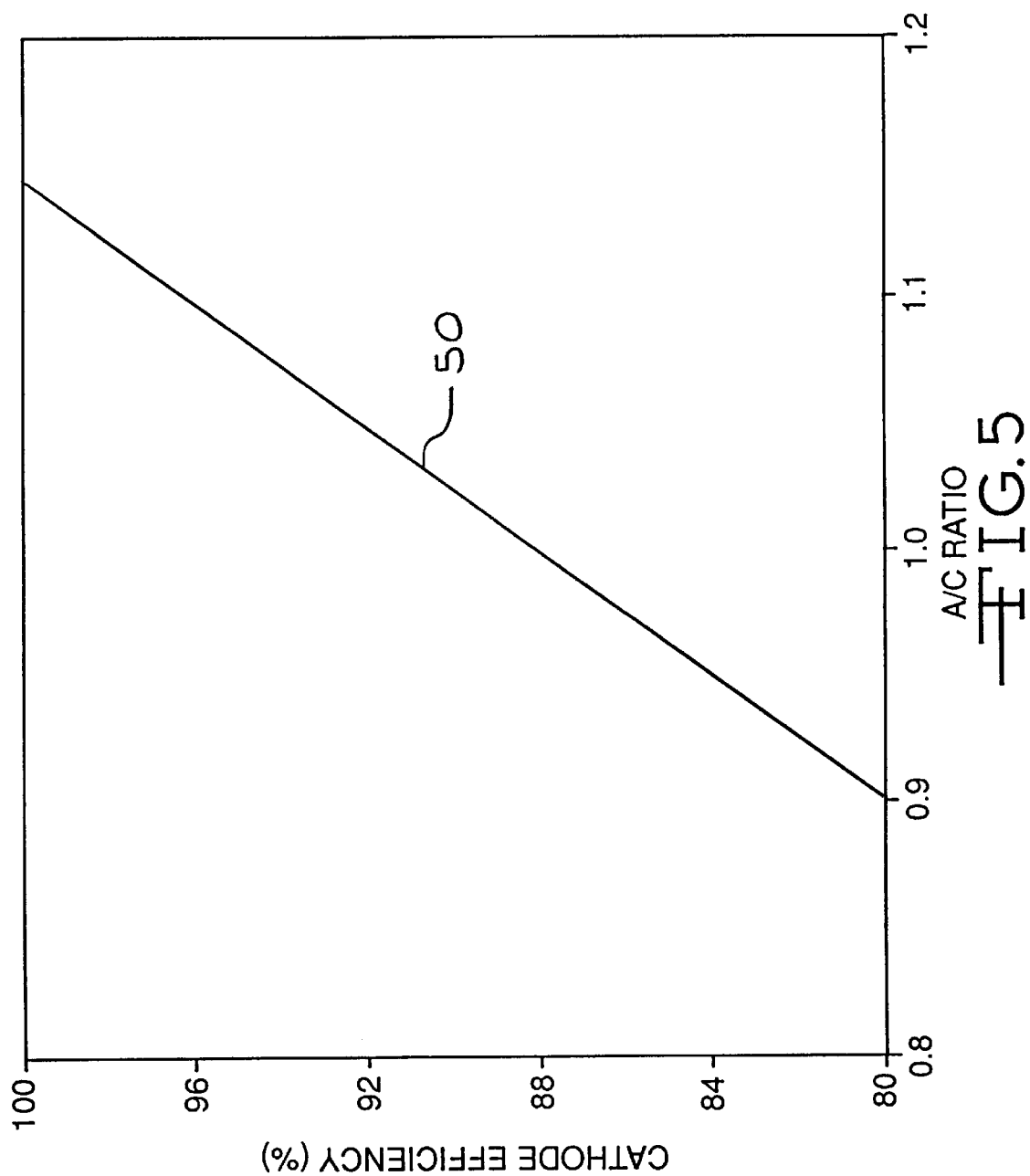
FIG. 5 is a graph correlating cathode discharge efficiency versus anode-to-cathode capacity ratios of Li/SVO cells.

FIG. 5 presents the correlation of A/C ratios and cathode efficiencies. A linear relationship is observed:

Cathode Efficiency (%x100)=4.1806+83.999 (A/C Ratio)

The equation shown in FIG. 5 (curve 50) is an empirical equation derived from experimental data. The interception, 4.1806, and slope, 83.999, are the results of the linear mathematical fitting of the experimental data points. The value $R^2$ is the representation of how good the correlation is. In perfect fitting, $R^2$ is equal to 1.00. The closer $R^2$ is to 1.00, the better the curve fitting. Thus, $R^2$=0.983 Indicates a very good curve fit with a concomitant high confidence that the linear relationship between cathode efficiency and A/C ratio holds up under experimental conditions.

From FIG. 4, the lower cathode efficiency limit is estimated to be 61%. With the above cathode efficiency equation, the lower limit for A/C is calculated to be 0.68. The calculated lower limit A/C ratio of the present invention is thus still larger than the recalculated A/C ratio range of 0.43 to 0.67 of the previously discussed Crespi et al. patent.

Figure 6:
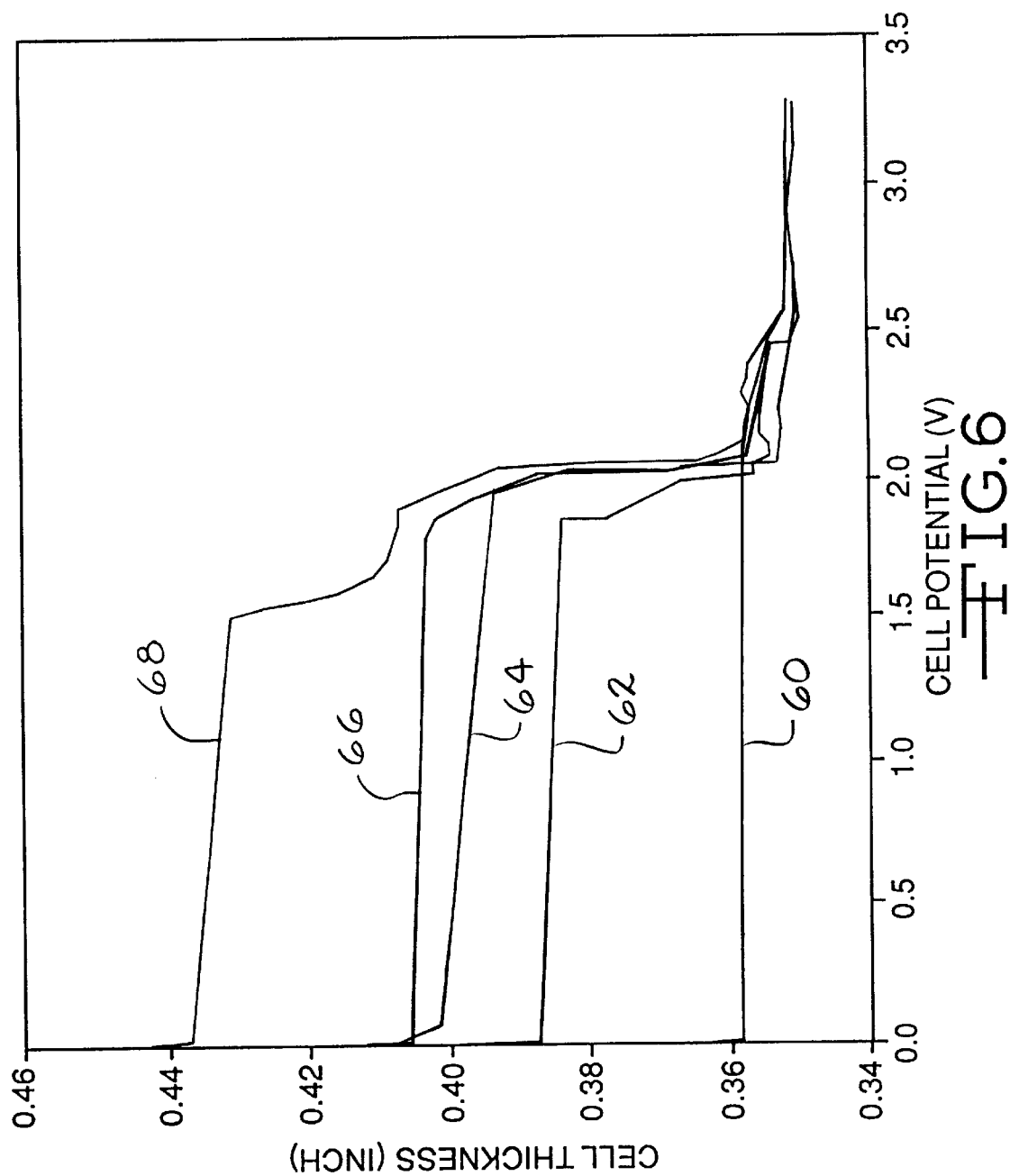
FIG. 6 is a graph constructed from cell swelling versus discharge potential of the Li/SVO cells used to construct the graph of FIG. 1.

FIG. 6 shows the relationship between cell potential and cell thickness. In particular, curve 60 was constructed from a representation Li/SVO cell having an A/C ratio of 0.923, curve 62 was constructed from a cell having an A/C ratio of 0.995, curve 64 was constructed from a cell having an A/C ratio of 1.044, curve 66 was constructed from a cell having an A/C ratio of 1.078 and curve 68 was constructed from a cell having an A/C ratio of 1.135. This graph indicates that when a Li/SVO cell starts to swell, the cell has already reached the end of the second plateau and the cell voltage is about 2.5V or below.

Based on the data in Table 1 and in FIGS. 1 to 6, the preferred A/C ratio for minimizing or preventing cell swelling in a Li/SVO cell is in the range of 0.68 to 1.00. However, a good cell design is predicated on utilizing cathode capacity as much as possible and at the same time minimizing the cell swelling. Therefore, the more preferred A/C ratio according to the present invention is in the range of 0.90 to 0.96 (corresponding to cathode efficiency of 80% to 85%). Within this range, the cell potential is on the second ramp which can also be used as the cells's end-of-life (EOL) indicator.

While the examples have been directed to the discharge of Li/SVO cells, qualitatively both Li/SVO and Li/CSVO cells behave similarly in terms of cell swelling. Quantitatively, the two systems may show some differences, for example the lower limit, the higher limit and the optimized A/C ratio range for Li/CSVO cells may be different from that of Li/SVO cells, due to the difference of their discharge voltage profiles. However, in both cell systems, cell swelling can be minimized or eliminated by using an anode limited design according to the present invention.

It is appreciated that various modifications to the inventive concepts described herein may be apparent to those skilled in the art without departing from the spirit and the scope of the present invention defined by the hereinafter appended claims.

What is claimed is:

1. A method for discharging an electrochemical cell, comprising the steps of:
   a) providing the electrochemical cell comprising: a casing;
      an anode comprising lithium as an anode active material; and
      a cathode comprised of silver vanadium oxide as a cathode active material;
   b) operatively associating the anode with the cathode housed inside the casing with the anode active material and the cathode active material in a maximum anode-to-cathode capacity ratio of 0.68 to about 0.96 based on the gram amount of anode and cathode active materials with a theoretical maximum capacity of 7.0 equivalents of lithium required to completely discharge one equivalent of silver vanadium oxide and wherein the anode and the cathode are connected to respective terminals;
   c) activating the anode and the cathode with an electrolyte filled into the casing; and
   d) discharging the cell to the anode-to-cathode capacity ratio of 0.68 to about 0.96.

2. The method of claim 1 including providing the anode having a current collector selected from the group consisting of titanium, nickel, copper, tungsten and tantalum.

3. The method of claim 1 including providing the silver vanadium oxide present in the cathode in about 80% to about 95%, by weight, remainder being at least one of a binder material and a conductive additive.

4. The method of claim 1 including providing the cathode having a current collector selected from the group consisting of titanium, stainless steel, tantalum, platinum and gold.

5. The method of claim 1 including providing the electrolyte solution operatively associated with the anode and the cathode comprising an ion-forming lithium salt dissolved in a nonaqueous solvent.

6. The method of claim 5 including selecting the lithium salt from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

7. The method of claim 5 including providing the nonaqueous solvent comprising at least one organic solvent selected from the group consisting of tetrahydrofuran, methyl acetate, diglyme, triglyme, tetraglyme, dimethyl carbonate, 1,2-dimethoxyethane, 1,2-diethoxyethane, 1-ethoxy, 2-methoxyethane, diethyl carbonate, acetonitrile, dimethyl sulfoxide, dimethyl formamide, dimethyl acetamide, propylene carbonate, ethylene carbonate, γ-valerolactone, γ-butyrolactone and N-methyl-pyrrolidinone, and mixtures thereof.

8. The method of claim 1 including providing a separator between the anode and the cathode to prevent internal short circuit conditions.

9. The method of claim 1 including providing the casing comprising a conductive material selected from the group consisting of titanium, stainless steel, mild steel, nickel, nickel-plated mild steel and aluminum.

10. The method of claim 1 including providing lithium as the anode active material contacting a nickel current collector and silver vanadium oxide as the cathode active material contacting a titanium current collector and activating the anode and the cathode with the electrolyte comprising 1.0M $LiAsF_6$ in a 50:50 mixture, by volume, of propylene carbonate and 1,2-dimethoxyethane.

11. A method for discharging an electrochemical cell, comprising the steps of:
   a) providing the electrochemical cell comprising: a casing;
      an anode comprising lithium as an anode active material;
      a cathode comprised of silver vanadium oxide as a cathode active material;
   b) activating the anode and the cathode with an electrolyte filled into the casing, wherein the electrolyte is capable of catalytically forming propene gas during cell discharge and wherein based on a theoretical maximum capacity of 7.0 equivalent of lithium intercalated into one equivalent of silver vanadium oxide, there is an excess of the cathode active material to the anode active material in terms of delivered capacity; and
   c) discharging the cell so that the catalyst for forming gaseous propene is essentially not formed by the cell having a maximum anode-to-cathode capacity of 4.8 to about 6.7 units of lithium per unit of silver vanadium oxide, thereby limiting the percent total cell thickness change throughout discharge to less than about 10 percent.

12. The method of claim 11 including providing the silver vanadium oxide present in the cathode in about 80% to about 95%, by weight, remainder being at least one of a binder material and a conductive additive.

13. A method for discharging an electrochemical cell, comprising the steps of:
   a) providing the electrochemical cell comprising: a casing;
      an anode comprising lithium as an anode active material; and
      a cathode comprised of silver vanadium oxide as a cathode active material;
   b) activating the anode and the cathode with an electrolyte filled into the casing, wherein the electrolyte comprises propylene carbonate; and
   c) discharging the cell to form a lithiated cathode material having the general formula $Li_xAg_2V_4O_{11}$ with x being 4.8 to about 6.7 units of lithium per unit of silver vanadium oxide.

* * * * *

UNITED STATES PATENT AND TRADEMARK OFFICE
CERTIFICATE OF CORRECTION

PATENT NO. : 6,171,729
DATED : Jan. 9, 2001
INVENTOR(S) : Gan et al.

It is certified that error appears in the above-identified patent and that said Letters Patent is hereby corrected as shown below:

Cover page, item [75] - "Takuchi" should be --Takeuchi--.

Col. 6, line 47 - "(p7 equivalents" should be --(7 equivalents--.

Col. 8, line 41 - "ah" should be --an--.

Signed and Sealed this

Twenty-ninth Day of May, 2001

Attest:

NICHOLAS P. GODICI

Attesting Officer

Acting Director of the United States Patent and Trademark Office